United States Patent
Feldner

(10) Patent No.: US 9,673,564 B2
(45) Date of Patent: Jun. 6, 2017

(54) ELECTRICAL PLUG CONNECTOR PART WITH A DRAIN AND AN INTERMEDIATE CHAMBER

(71) Applicant: Phoenix Contact E-Mobility GmbH, Schieder-Schwalenberg (DE)

(72) Inventor: Ralf Feldner, Detmold (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/024,061

(22) PCT Filed: Sep. 22, 2014

(86) PCT No.: PCT/EP2014/070086
§ 371 (c)(1),
(2) Date: Mar. 23, 2016

(87) PCT Pub. No.: WO2015/044069
PCT Pub. Date: Apr. 2, 2015

(65) Prior Publication Data
US 2016/0248195 A1  Aug. 25, 2016

(30) Foreign Application Priority Data
Sep. 24, 2013 (DE) .................. 10 2013 110 547

(51) Int. Cl.
H01R 4/64 (2006.01)
H01R 13/52 (2006.01)
H01R 13/502 (2006.01)

(52) U.S. Cl.
CPC ....... *H01R 13/5227* (2013.01); *H01R 13/502* (2013.01); *H01R 2201/26* (2013.01)

(58) Field of Classification Search
CPC  H01R 13/5219; H01R 13/5227; H01R 13/53; H01R 13/523; H01R 13/641
(Continued)

(56) References Cited

U.S. PATENT DOCUMENTS 3,887,256 A  6/1975  Klimek et al.
5,478,245 A  12/1995  Okada et al.
(Continued)

FOREIGN PATENT DOCUMENTS

DE  2414867 A  10/1974
DE  69428636 T2  5/2002
(Continued)

*Primary Examiner* — Chandrika Prasad
(74) *Attorney, Agent, or Firm* — Leydig, Voit & Mayer, Ltd.

(57) ABSTRACT

A plug connector part for transferring a charge current includes a first housing part, which has a plug section and at least one contact opening arranged in the plug section, having a contact arranged therein. The plug section can be engaged with an additional plug connector part along a plug-in direction and has an outside wall extending along the plug-in direction. A second housing part has a wall, which is opposite the outside wall of the plug section at least in sections and forms, together with the outside wall, an intermediate chamber. The plug section has at least one drain opening, which extends from the at least one contact opening to the outside wall to direct a liquid out of the contact opening into the intermediate chamber.

15 Claims, 5 Drawing Sheets

(58) Field of Classification Search
USPC .......................................... 439/190, 205, 206
See application file for complete search history.

(56) References Cited

U.S. PATENT DOCUMENTS

| | | | |
|---|---|---|---|
| 5,564,944 A | 10/1996 | Fukuda | |
| 5,860,822 A * | 1/1999 | Nishide | H01R 13/5227 |
| | | | 439/206 |
| 8,075,325 B1 | 12/2011 | Kao et al. | |
| 8,257,101 B2 * | 9/2012 | Ichio | H01R 13/4367 |
| | | | 439/206 |
| 2011/0212645 A1 | 9/2011 | Osawa et al. | |
| 2015/0343914 A1 * | 12/2015 | Osawa | B60L 11/1818 |
| | | | 439/205 |
| 2016/0013580 A1 * | 1/2016 | Matsuda | H01R 13/5202 |
| | | | 439/190 |

FOREIGN PATENT DOCUMENTS

| | | |
|---|---|---|
| DE | 102011004648 A1 | 8/2012 |
| EP | 06314818 B1 | 12/1999 |
| EP | 2390959 A1 | 11/2011 |
| EP | 2573880 A1 | 3/2013 |
| WO | WO 2011104609 A1 | 9/2011 |

* cited by examiner

ELECTRICAL PLUG CONNECTOR PART WITH A DRAIN AND AN INTERMEDIATE CHAMBER

CROSS-REFERENCE TO RELATED APPLICATIONS

This application is a U.S. national stage application under 35 U.S.C. §371 of International Application No. PCT/EP2014/070086, filed on Sep. 22, 2014, and claims benefit to German Patent Application No. DE 10 2013 110 547.5, filed on Sep. 24, 2013. The International Application was published in German on Apr. 2, 2015, as WO 2015/044069 A1 under PCT Article 21(2).

FIELD

The invention concerns an electrical plug connector part for transmitting a charging current.

BACKGROUND

An electrical plug connector part may include a first housing part, which comprises a plug section and at least one contact opening disposed in the plug section with a contact disposed therein. The plug section may be engaged with another electrical plug connector part along a plug-in direction, and comprises an outer wall extending in the plug-in direction. A second housing part is provided which comprises a wall and which, at least in sections, lies across from the outer wall of the plug section and forms an intermediate chamber with the outer wall. The second housing part functions as a screen and, for this purpose, extends at least in sections around the plug section, whereby another complementary electrical plug connector part with a plug contour disposed therein may be inserted into the intermediate chamber so as to introduce at least one contact into the at least one contact opening to establish electrical contact.

Such electrical plug connector parts for transmitting a charging current are used, for example, in electric vehicles, at charging stations for recharging electric vehicles or charging cables to connect an electric vehicle to a charging station. Since an electrical plug connector part disposed on a vehicle, for example, is also used outdoors during normal use of the vehicle, and since sealing of the electrical plug connector part to the outside is difficult, if not impossible, during rainy weather, for example, moisture may penetrate into the electrical plug connector part, in particular into the contact openings. For this reason, is necessary to ensure that water which has made its way into the contact openings may flow back out, so that contacts disposed in the contact openings may be in safe and reliable contact with the contacts of another, complementary, electrical plug connector part. During frost, in particular, standing water in a contact opening may freeze, which could potentially make connecting a complementary electrical plug connector part, and thus a charging procedure, impossible.

Therefore, in this type of electrical plug connector part, and as described for example in WO 2011/104 609 A1, a drain towards a plane lying behind the contact opening in the plug-in direction is traditionally provided on a contact opening. However, this has the disadvantage that a space must be provided behind the contact openings, when viewed from the plug-in direction, into which draining may occur but which also has to be sealed.

In an electrical plug connector part known from EP 2 573 880 A1, a drainage system is provided with drainage channels, which are configured to direct water toward a discharge line.

Other electrical plug connector parts which provide for drainage are known, for example, from DE 694 28 636 T2 and EP 0 634 818 B1.

SUMMARY

An aspect of the invention provides an electrical plug connector part for transmitting a charging current, the part comprising: a first housing part including a plug section and a contact opening disposed in the plug section, including a contact disposed in the contact opening, wherein the plug section is configured to engage along a plug-in direction with a further connector component and includes an outer wall extending in the plug-in direction; and a second housing part including a second wall which, at least in sections, lies across from the outer wall of the plug section, the second wall together with the outer wall forming an intermediate chamber between the outer wall of the plug section and the second wall of the second housing part, wherein the plug section includes a drain opening which extends from the contact opening to the outer wall, wherein the drain opening is configured to direct a liquid from the contact opening into the intermediate chamber between the outer wall and the second wall.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
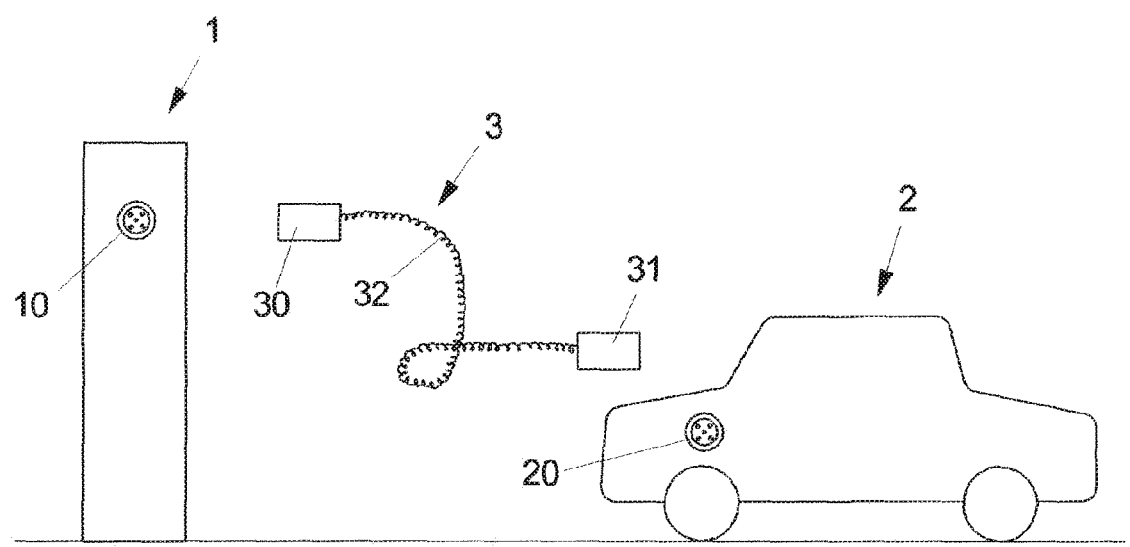
FIG. 1 a schematic view of a vehicle at a charging station for charging the vehicle.

There is therefore a need for electrical plug connector parts which allow water to drain in some other manner.

An aspect of the invention provides an electrical plug connector part which allows draining in a manner that is simple and cost-effective to manufacture, and is also convenient to seal.

According to an aspect of the invention, the plug section comprises at least one drain opening which extends from the at least one contact opening to the outer wall and is configured to direct a liquid from the contact opening into the intermediate chamber between the outer wall of the plug section of the first housing part and the wall of the second housing part.

An aspect of the present invention provides drain openings on the plug section, which drain openings are able to guide liquid which has penetrated into the contact openings of the plug section toward the outer wall, and thus into the intermediate space enclosed within the second housing part. The second housing part functions as a screen, and extends in a circumferential direction around the plug-in direction around the plug section of the first housing part. The intermediate chamber is enclosed between the outer wall of the plug section and the wall of the second housing part, and forms the space into which a plug contour of another complementary electrical plug connector part is inserted for connection to the electrical plug connector part.

Since drainage occurs into the intermediate chamber between the plug section and the wall of the second housing part, the provision of an additional drainage plane behind the normatively specified plane of the electrical plug connector part may be omitted. The intermediate chamber formed between the plug section and the second housing part may be sealed in a comparatively simple manner without the risk of excessive stresses at a seal which is used for this purpose.

The plug section preferably comprises a plurality of contact openings with contacts disposed thereon, wherein exactly one drain opening is associated with each contact opening. The contact openings extend along the plug-in direction so that, for example, contact pins of another electrical plug connector part may be inserted into the contact openings in the plug-in direction. The drain openings preferably extend transverse to the plug-in direction, thereby connecting the contact openings to the intermediate chamber surrounding the plug section, so that moisture may be directed out of the contact openings into the intermediate chamber.

Draining preferably occurs in a gravity-driven manner. For this purpose, the drain opening associated with a contact opening opens the contact opening downward—referring to an intended arrangement and use of the electrical plug connector part, for example on a vehicle —so that moisture, for example rain water, which has made its way into contact opening can flow through the drain opening and out of the contact opening due to the effect of gravity. Viewed in the direction of gravitational force, in which gravity acts, the drain opening is preferably disposed at the lowest point of the contact opening, so that gravity causes the liquid to flow out of the contact opening into the drain opening, and the liquid is discharged into the intermediate chamber.

In a specific embodiment of an electrical plug connector part, the first housing part comprises a first plug section and a second plug section spaced apart from one another transverse to the plug-in direction. In contrast, the second housing part comprises a first wall which forms a first intermediate chamber together with the first plug section, and a second wall which forms a second intermediate chamber together with the second plug section. For example, such an electrical plug connector part may be realized with a so-called combo-connector which is configured both for the transmission of an alternating current, as well as for the transmission of a direct current for charging a vehicle at a variety of charging stations. In this case, load contacts for transmitting an alternating current may be disposed on the first plug section, for example, while the second plug section comprises load contacts for transmission of a direct current. In doing so, the intermediate chambers formed at the different plug sections may be in flow connection with one another, whereby for example, viewed in the direction of gravitational force, the first plug section is disposed above the second plug section, so that liquid may flow from the first intermediate chamber associated with the first plug section into the second intermediate chamber associated with the second plug section via the opening between the intermediate chambers.

The first housing part may for example comprise a base on which the at least one plug section is disposed. In this case, the second housing part is in contact with the base and is sealed relative to the base of the first housing part by means of a sealing element. The plug section rises up from the base and projects, for example cylindrically, from the base (whereby the plug section does not necessarily have a circular cross-section), and the wall of the second housing part connects to the base and extends around the plug section. A simple sealing of the second housing part relative to the base of the first housing part is possible by means of the sealing element so that moisture from the intermediate chamber formed within the second housing part may not pass into a dry space on the side of the base facing away from the second housing part.

In order to permit the drainage of moisture from the intermediate chamber formed between the plug section and the wall of the first housing part, a discharge opening is preferably provided at the base, which - viewed in the direction of gravitational force—is preferably disposed at an area of the base below the plug section, so that liquid may flow gravity-assisted from the intermediate chamber into the discharge opening, and from there into a discharge line optionally connected to the discharge opening.

The intermediate chamber is thus drained via the discharge opening, so that water, which could potentially freeze, may not accumulate in the intermediate chamber either.

The discharge opening is advantageously formed in the base of the first housing part, so that a liquid may be drained via the base and a discharge line optionally connected to it. It is also conceivable and possible, however, to form a discharge opening in the wall of the second housing part for example, so that a drainage of the intermediate chamber may take place through the wall of the second housing part.

For the purposes of the present invention, the drain opening associated with a contact opening extends from the contact opening toward the outer wall of the plug section, which extends in the plug-in direction. Drainage therefore occurs via the outer wall of the plug section, and thus in an intermediate chamber which is formed between the plug section and the second housing part which serves as a screen. In order to make possible a simple manufacturing of the electrical plug connector part, the first housing part and the second housing part are preferably manufactured as separate, respectively one-piece molded parts, for example, by means of plastic injection molding. Due to the circumstance that the first housing part and the second housing part are manufactured separately, the drain openings associated with a plug section may readily be molded into the plug section, resulting in easy removal of the first housing part from the mold during manufacturing by means of plastic injection molding.

The drain openings may, for example, be formed into the plug section transverse to the plug-in direction by so-called sliders in the course of plastic injection molding. After the manufacturing of the molded parts, the first housing part and the second housing part are attached to one another, whereby a transition between the first housing part and the second housing part is sealed by means of a suitable sealing element to be moisture-proof FIG. 1 shows a schematic view of a vehicle 2 which is electrically driven and accordingly comprises an electrical system with an electric drive and an electric energy store in the form of rechargeable batteries (colloquially referred to as electric vehicle). The vehicle 2 comprises an electrical plug connector part 20 in the form of a charging jack which may be connected to a charging station 1 via a charging cable 3 to recharge the batteries of the vehicle 2, and thus to supply the vehicle 2 with electric power. The charging cable 3 comprises two electrical plug connector parts 30, 31 in the form of charging plugs, which are connected to one another via a cable 32. The charging station 1 comprises an electrical plug connector part 10 in the form of a charging jack. To connect the vehicle 2, the electrical plug connector part 31 of the charging cable 3 may be inserted into the electrical plug connector part 20 of the vehicle 2, and the electrical plug connector part 30 of the charging cable 3 may be inserted into the electrical plug connector part 10 of the charging station 1 so that lines within the cable 32 may establish an electrical connection between the vehicle 2 and the charging station 1.

Figure 2:
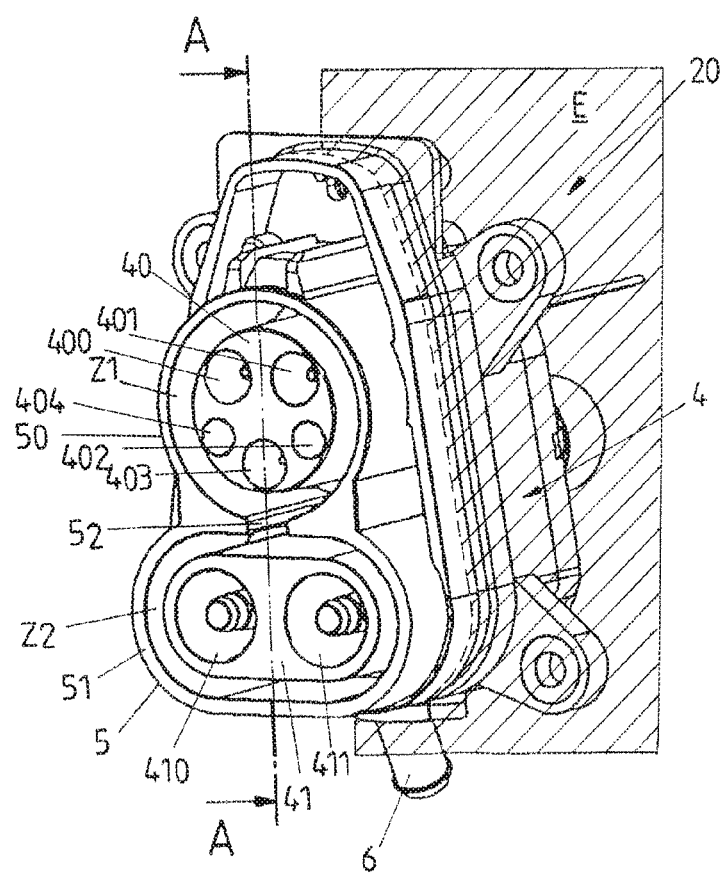
FIG. 2 a view of a design example of an electrical plug connector part in the form of a charging jack.
Figure 3:
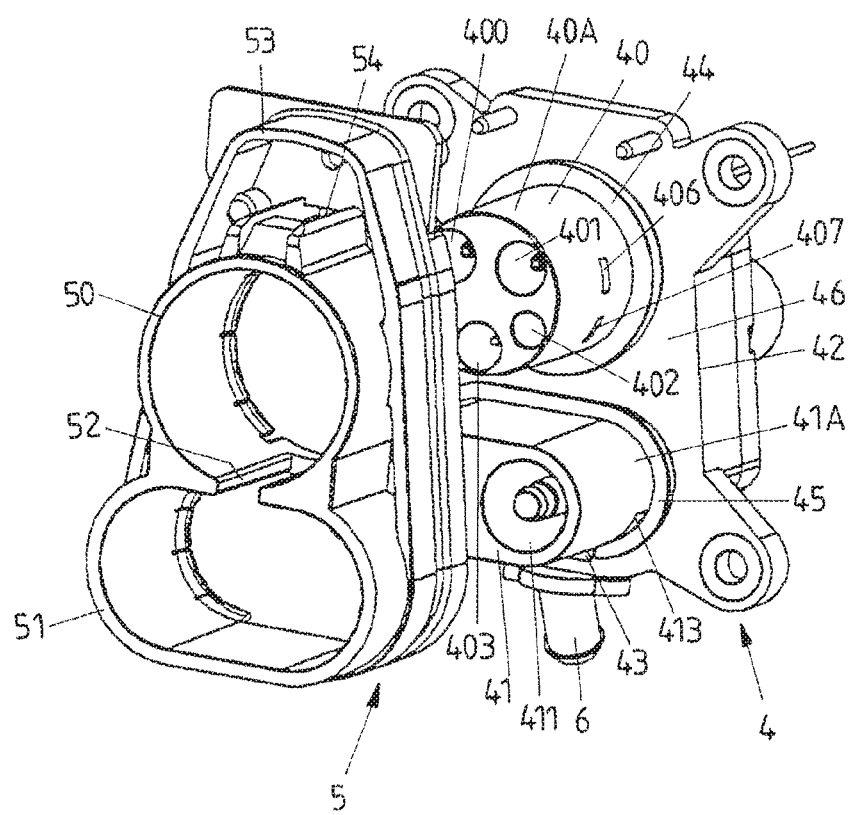
FIG. 3 a view of the electrical plug connector part according to FIG. 2, with separate housing parts.
Figure 4:
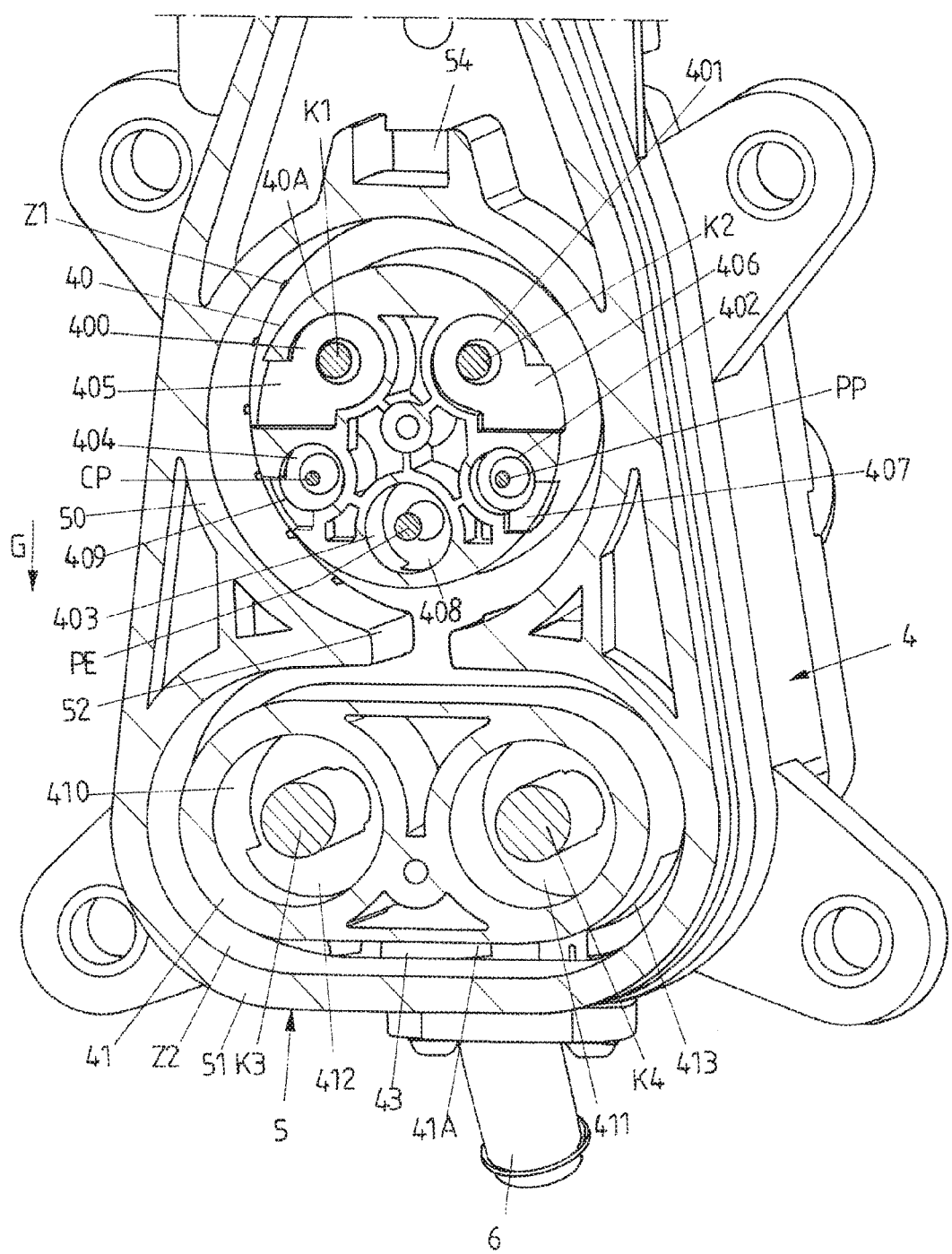
FIG. 4 a partial sectional view of the electrical plug connector part along a cross-sectional plane extending transverse to a plug-in direction.
Figure 5:
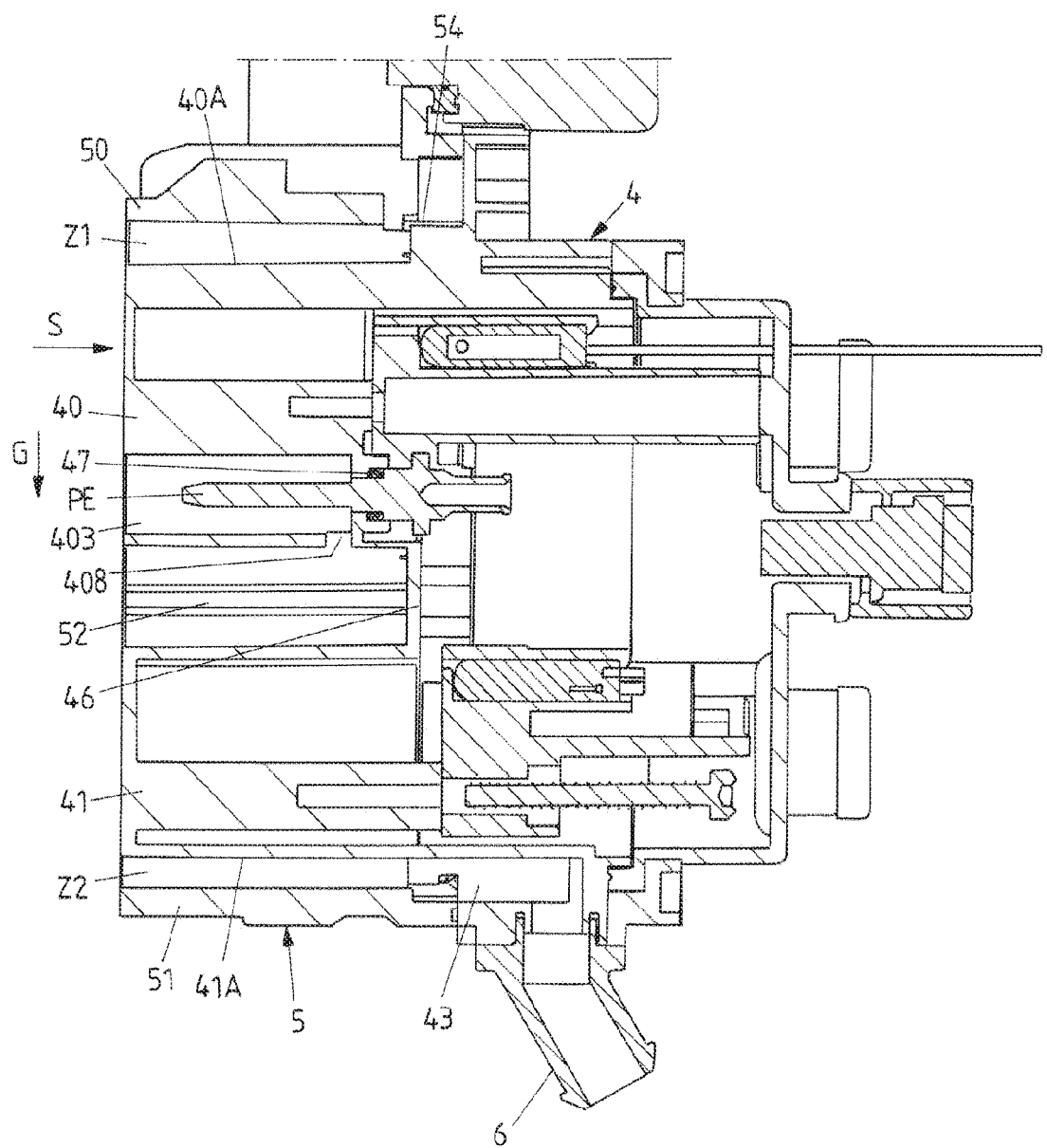
FIG. 5 a longitudinal sectional view through the electrical plug connector part.

FIGS. 2 to 5 show a design example of a electrical plug connector part 20, which may be used, for example, as a charging jack on a vehicle 2. FIGS. 2 and 3 show this electrical plug connector part in an overall view, whereby in FIG. 3 a first housing part 4 and a second housing part 5 of the electrical plug connector part 20 are shown separated from each other. FIG. 4 shows the electrical plug connector part 20 in a sectional view along a sectional plane E as shown in FIG. 2, and FIG. 5 shows a longitudinal sectional view along the line A-A in accordance with FIG. 2.

The design example of the electrical plug connector part 20 is realized by a so-called combo- connector, in which two plug sections 40, 41, projecting from a base 46 (see FIG. 3) with contact openings 400-404 or 410, 411 disposed thereon, are provided on a first housing part 4.

One contact CP, PE, PP, K1-K4 (see FIG. 4) is disposed in each respective contact opening, so that an electrical contact may be established by inserting contact elements of another complementary electrical plug connector part (for example the electrical plug connector part 31 shown in FIG. 1) into the contact openings 400-404, 410, 411.

In the depicted exemplary embodiment of a combo-connector, a charging current in the form of an alternating current may be transmitted via the upper plug section 40 of the first housing part 4. The contacts K1, K2 serve as load contacts for the transmission of a single-phase alternating current, while the contact CP provides a so-called pilot contact for the transmission of control signals, the contact PP provides a so-called proximity contact and the contact PE provides a contact for a ground conductor. Disposed on the lower plug section 41, on the other hand, are load contacts K3, K4 for the transmission of a direct current. The combo-connector may thus be used either for the transmission of an alternating current or for the transmission of a direct current, whereby the five contacts of the upper plug section 40 are connected when the connector is being used for the transmission of an alternating current. When the connector is being used for the transmission of a direct current, on the other hand, the contacts CP, PP and PE of the upper plug section 40, and the load contacts K3, K4 of the lower plug section 41 are connected.

It should be noted here that the present invention is fundamentally independent of the exact configuration of the electrical plug connector part 20. A drainage, as it is to be described in the following, may also be used in electrical plug connector parts which are completely different from those shown here.

In the depicted exemplary embodiment, a second housing part 5, which forms two walls 50, 51, is disposed on the first housing part 4. The upper wall 50 extends around the upper plug section 40 of the first housing part 4 and the second wall 51 extends around the lower plug section 41 of the first housing part 4. The second housing part 5 serves as a screen and together with the plug sections 40, 41 of the first housing part 4 forms two intermediate chambers Z1, Z2 which extend around the plug sections 40, 41 in an annular fashion.

The electrical plug connector part 20 may be made to engage with another complementary electrical plug connector part (for example the electrical plug connector part 31 shown in FIG. 1) by inserting a plug contour of the other electrical plug connector part in at least one of the intermediate chambers Z1, Z2, whereby contact elements of the other electrical plug connector part are inserted into the contact openings 400-404, 410, 411 of one or both plug sections 40, 41 so that a contacting of the contacts CP, PE, PP, K1-K4 disposed in the contact openings occurs in a predetermined manner. Insertion of the other complementary electrical plug connector part is done in a plug-in direction S (see FIGS. 2 and 5). The intermediate chambers Z1, Z2 and the contact openings 400-404, 410, 411 correspondingly extend in the plug-in direction S.

As may be seen in FIG. 3, the plug sections 40, 41 of the first housing part 4 project from the base 46 as elevated sections. Elevations 44, 45, which extend around the plug sections 40, 41 and to which the second housing part 5 is to be attached, are provided on the bottom of the plug sections 40, 41. In the attached state, the second housing part 5 abuts against the base 46 of the first housing part 4, whereby the transition between the first housing part 4 and the second housing part 5 is sealed by means of a circumferential sealing element 42.

The walls 50, 51 of the second housing part 5, are interrupted by a slot-like opening 52, which extends in plug-in direction S, so that the intermediate chambers Z1, Z2 formed by the walls 50, 51 are in flow connection with one another.

As may be seen in FIGS. 3 and 4, exactly one drain opening 405-409, 412, 413 is provided at each contact opening 400-404, 410, 411 of the plug sections 40, 41, the drain openings opening the respective contact openings 400-404, 410, 411 towards an intermediate chamber Z1, Z2. These drain openings 405-409, 412, 413 serve to drain the contact openings 400-404, 410, 411 and open the contact openings 400-404, 410, 411 downwards - viewed in the direction of gravitational force in which gravity acts during the intended application and the intended use of the electrical plug connector part 20 (see FIG. 5). Viewed in the direction of gravitational force G, the drain openings 405-409, 412, 413 form the lowest point in the respective associated contact opening 400-404, 410, 411, so that, as a result of gravity, liquid which penetrates into a contact opening 400-404, 410, 411 flows into the respective associated drain opening 405-409, 412, 413 and is thus drained out of the contact opening 400-404, 410, 411.

Each plug section 40, 41 comprises an outer wall 40A, 41A, which limits the plug section 40, 41 in an outward direction. The drain openings 405-409 extend substantially transverse to the plug-in direction S from the respective associated contact opening 400-404, 410, 411 toward the outer wall 40A, 41A of the respective plug section 40, 41, so that draining occurs via the outer wall 40A, 41A. Across from each outer wall 40A, 41A there is an associated wall 50, 51 of the second housing part 5, so that the respective intermediate chamber Z1, Z2 is formed between the outer wall 40A, 41A and each associated wall 50, 51.

As may be seen in FIG. 4, one drain opening 405-409 which opens the contact opening towards the first upper intermediate chamber Z1 is associated with each contact opening 400-404 of the first, upper plug section 40. Therefore, liquid from these contact openings 400-404 may flow into the intermediate chamber Z1, whereby, driven by gravity, the liquid flows around the plug section 40 and toward the opening 52 between the intermediate chambers Z1, Z2, as a result of which it enters the second, lower intermediate chamber Z2 and flows around the second plug section 41.

A discharge opening 43 is disposed on the base 46 at a point below the plug sections 40, 41, the discharge opening opening the base 46 toward a discharge line 6 and allowing the fluid to fall out of the second intermediate chamber Z2. Liquid in the second intermediate chamber Z2 may thus flow out of the second intermediate chamber Z2 through the discharge opening 43, whereby the discharge opening 43 is disposed at the lowest point of the second intermediate chamber Z2 and thus, as a result of gravity, liquid flows out of the second intermediate chamber Z2 towards the opening 43.

This is clearly evident also from FIG. 5: In the intended arrangement and use of the electrical plug connector part 20, viewed in the direction of gravitational force G, the discharge opening 43 represents the lowest point within the second housing part 5, so that liquid flows, gravity-assisted, out of the intermediate chambers Z1, Z2 into the discharge opening 43, and may be drained via the discharge line 6.

The discharge line 6 may be routed to a wet space of a vehicle 2, for example, so that liquid may be drained into a wet space of the vehicle 2 via the discharge line 6.

It is also possible, however, for the discharge line 6 to open to the outside; in other words to a space outside the vehicle 2.

As may further be seen in FIG. 5, a contact pin, which embodies a contact PE, is sealed in relation to the base 46 by an annular sealing element 47 (also referred to as O-ring), so that moisture from the associated contact opening 403 may not penetrate through the base 46.

In the upper wall 50 of the second housing part 5, which is associated with the first plug section 40, an opening 54 is disposed above the first plug section 40, the opening opening the wall 50 towards a space enclosed by a wall 53 of the second housing part 5. Liquid may flow out of the spaced enclosed by the wall 53 via the opening 54 and the space may thus be drained.

The idea underlying the invention is not limited to the above described exemplary embodiments, but may rather fundamentally be realized in entirely different embodiments as well.

The invention is in particular not limited to the specifically pictured and described exemplary embodiments of an electrical plug connector part with the specifically indicated configuration of contacts. Drainage of the type described here may be used in very different electrical plug connector parts, not only in combo-connectors.

A electrical plug connector part of the type described here may in principle be used in a vehicle, but also in a charging station or a charging cable. Drainage may be used both in a charging jack as well as in a charging plug.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCES

1 Charging station
10 Jack
2 Vehicle
20 Jack
3 Charging cable
30, 31 Plug
4 Housing part
40 Plug section
40A Outer wall
400-404 Contact opening
405-409 Drain opening
41 Plug section
41A Outer wall
410, 411 Contact opening
412, 413 Drain opening
42 Sealing element
43 Discharge opening
44, 45 Elevation
46 Base
47 Sealing ring
5 Housing part
50, 51 Wall section
52 Opening
53 Wall
54 Opening
6 Discharge line
CP Pilot contact
E Sectional plane
G Direction of gravitational force
K1, K2, K3, K4 Load contact
PE Protective ground contact
PP Proximity contact
S Plug-in direction
Z1, Z2 Intermediate chamber

The invention claimed is:

1. An electrical plug connector part for transmitting a charging current, the part comprising:
 a first housing part including a plug section and a contact opening disposed in the plug section, including a contact disposed in the contact opening, wherein the plug section is configured to engage along a plug-in direction with a further connector part and includes an outer wall extending in the plug-in direction; and a second housing part including a second wall which, at least in sections, lies across from the outer wall of the plug section, the second wall together with the outer wall forming an intermediate chamber between the outer wall of the plug section and the second wall of the second housing part, wherein the plug section includes a drain opening which extends from the contact opening to the outer wall, wherein the drain opening is configured to direct a liquid from the contact opening into the intermediate chamber.

2. The part of claim 1, wherein the second wall extends in a circumferential direction around the plug-in direction around the plug section of the first housing part.

3. The part of claim 1, wherein the plug section includes a plurality of contact openings, and wherein exactly one drain opening is associated with each contact opening.

4. The part of claim 1, wherein the contact opening extends in the plug-in direction, and wherein the drain opening extends transverse to the plug-in direction.

5. The part of claim 1, wherein the drain opening opens the contact opening downward during operation of the electrical plug connector part, viewed in a direction of gravitational force.

6. The part of claim 1, wherein the first housing part includes a second plug section, wherein the plug sections are spaced apart from one another transverse to the plug-in direction, and wherein the second wall includes a first portion which forms the intermediate chamber together with the plug section, and a second portion which forms a second intermediate chamber together with the second plug section.

7. The part of claim 6, wherein the intermediate chamber and the second intermediate chamber are in flow connection via an opening.

8. The part of claim 1, wherein the first housing part includes a base on which the plug section is disposed, wherein the second housing part is disposed against the base and is sealed relative to the base using a sealing element.

9. The part of claim 8, wherein the base includes a discharge opening configured to drain a liquid from the intermediate chamber.

10. The part of claim 9, further comprising:

a discharge line, connected to the discharge opening, configured to drain the liquid away from the electrical plug connector part.

11. The part of claim 9, wherein, in operation, viewed in a direction of gravitational force, the discharge opening is disposed below the plug section on the base.

12. The part of claim 1, wherein the first housing part and the second housing part are separate, respectively one-piece molded parts.

13. The part of claim 1, wherein the first housing part and the second housing part are plastic injection-molded parts.

14. The part of claim 1, comprising more than one contact opening.

15. The part of claim 1, comprising more than one drain opening.

* * * * *